United States Patent [19]
Glabe et al.

[11] 3,833,413
[45] Sept. 3, 1974

[54] SOLIDIFIED PRODUCT FROM HIGH FRUCTOSE CORN SYRUP AND PROCESS

[75] Inventors: Elmer F. Glabe, Chicago; Perry W. Anderson, Niles; Stergios Laftsidis, Chicago, all of Ill.

[73] Assignee: Food Technology, Inc., Chicago, Ill.

[22] Filed: Sept. 5, 1972

[21] Appl. No.: 286,568

[52] U.S. Cl............... 127/29, 127/58, 127/61, 426/212, 426/213, 426/215, 426/380, 426/459
[51] Int. Cl................................ A23l 1/08
[58] Field of Search......... 99/142, 98, 99, 199, 146; 426/212, 380, 459; 127/58, 61, 30

[56] References Cited
UNITED STATES PATENTS

| | | | |
|---|---|---|---|
| 2,007,971 | 7/1935 | Jackson | 127/58 |
| 2,693,420 | 11/1954 | Straub | 99/146 |
| 2,947,636 | 8/1960 | Sair | 99/142 |
| 3,607,392 | 9/1971 | Lauer et al. | 127/58 |
| 3,684,573 | 8/1972 | Voigt et al. | 127/30 |
| 3,704,168 | 11/1972 | Hara et al. | 127/58 |

*Primary Examiner*—A. Louis Monacell
*Assistant Examiner*—J. M. Hunter
*Attorney, Agent, or Firm*—Richard L. Johnston

[57] ABSTRACT

A solidified product from high fructose corn syrup is prepared by a process in which a high protein, high water soluble soy protein is incorporated with a high fructose corn syrup to form a slurry prior to dehydration and enhances the crispness and rapidity of crystalline formation when the slurry is subsequently dehydrated as a thin film on a heated surface.

7 Claims, No Drawings

SOLIDIFIED PRODUCT FROM HIGH FRUCTOSE CORN SYRUP AND PROCESS

BACKGROUND OF THE INVENTION

The term "high fructose corn syrup" as used herein refers to a corn syrup in which the solids content is a minimum of at least 40 percent by weight fructose (levulose), at least 40 percent by weight dextrose and the remainder higher saccharides, chiefly maltose. The water content can vary but is usually around 29.0 percent by weight. The mineral content is small, usually about 0.05 percent by weight. A typical high fructose corn syrup contains 29.0 percent water and 71 percent solids. The solids consist essentially of 42 percent fructose, 50.0 percent dextrose and 8.0 percent higher saccharides, chiefly maltose.

In contrast to regular corn syrups that can be spray dried, this high fructose corn syrup cannot be spray dried satisfactorily because of its composition. Regular corn syrups have the following composition (Proceedings of the 37th Annual Meeting of the Bakery Engineers-1961, page 103, Table 3):

|  | % By Weight | | |
| --- | --- | --- | --- |
|  | Regular | Medium | High |
| Water | 19.7 | 19.3 | 18.2 |
| Solids | 80.3 | 80.7 | 81.8 |
| Ash (mineral) | 0.3 | 0.4 | 0.3 |

The solids of corn syrup is all carbohydrate with the exception of the small amount of ash or mineral material. The composition of the carbohydrate fraction is as follows:

|  | % By Weight | | |
| --- | --- | --- | --- |
| Dextrose | 19.3 | 9.1 | 37.0 |
| Maltose | 14.3 | 51.9 | 31.5 |
| Higher Saccharides | 66.4 | 39.0 | 31.5 |

The contrast in composition of the high fructose corn syrup and regular corn syrup is quite evident.

Another type of sugary syrup that has been difficult to dry is liquid honey. Honey has the following composition (average of 490 samples of liquid honey Table 1, page 11, "Composition of American Honey," United States Department of Agriculture Research Technical Bulletin 1M-2b):

|  | % By Weight | |
| --- | --- | --- |
|  | Normal Moisture Basis | Solids Calculated to a Dry Basis |
| Water | 17.200 | — |
| Fructose | 38.190 | 46.200 |
| Dextrose | 31.280 | 37.705 |
| Sucrose | 1.310 | 1.582 |
| Maltose | 7.310 | 8.828 |
| Higher Saccharides | 1.500 | 1.810 |
| Ash | 0.169 | 0.204 |
| Nitrogen | 0.041 | 0.050 |
| Undetermined | 3.000 | 3.621 .621 |
|  | 100.000 | 100.000 |

Comparing liquid honey with high fructose corn syrup, it is quite evident that the fructose content in the latter is relatively close to that of liquid honey. However, liquid honey contains an appreciable quantity of sucrose and also nitrogen or protein. Furthermore, the quantity of dextrose in high fructose corn syrup is very appreciably higher than that in liquid honey. It is these characteristics of high fructose corn syrup which makes the dehydration of it a difficult procedure, requiring a unique and novel approach. Of even greater importance is the stabilizing of the dried product so that it will be substantially non-hygroscopic.

Straub, U.S. Pat. No. 2,693,420 describes the preparation of a solidified honey product using a starch material in the process. According to the patentee various kinds of starches can be used including rice, potato, waxy maize, sweet potato, tapioca and arrowroot. The starch can be gelatinized or pre-gelatinized or otherwise modified. Wheat flour and other starch containing flours can be used. The starch material is mixed with the liquid honey and the mixture heated on trays in a tunnel dried or in a pan-type evaporator under vacuum. Subsequently, the dried product is crushed, pulverized or ground. Alternatively, the honey-starch mixture can be mixed with water and dried on a roller drier or a spray drier. Another alternative suggested by Straub is the use of soybean flour. Straub also suggests that when flour is employed as the starch containing ingredient, the best results are obtained when refined or deglutenized flour is used, thereby indicating that the protein content of the flour should be removed.

The procedures specifically outlined by Straub do not give satisfactory results when applied to high fructose corn syrup.

While it is possible to use the high fructose corn syrup in its liquid form, it would be desirable to provide a solidified high fructose-containing product in the form of a dry appearing flowable powder similar to cane sugar. Ordinary cane sugar, although hygroscopic, maintains its free-flowing properties. A solid product which is free-flowing has a number of advantages, especially in making food products, for example, bread, cakes, pastries, ice cream and the like.

In copending application Ser. No. 65,737, filed Aug. 20, 1970, now U.S. Pat. No. 3,718,484 a process for making a solidified product from high fructose corn syrup with or without honey, in the form of a dry-appearing, flowable powder free of gummy, sticky and lumpy characteristics has been described. In this process high fructose corn syrup, with or without honey, is intimately mixed with an ungelatinized starch having a gelatinization temperature of at least 150°F. in sufficient amount to form a slurry, heating said slurry at a temperature 15° to 30° below the gelatinization temperature of said starch and holding said slurry at said temperature until the starch is conditioned to the extent that it will only partially gelatinize when subsequently heated above the gelatinization temperature and subsequently subjecting said slurry in a thin film to a heated surface above said gelatinization temperature for a period of time sufficient to dehydrate said slurry and simultaneously to partially gelatinize said starch, the quantity of said starch and the degree of gelatinization being sufficient to give a product which, when ground, forms a dry-appearing, flowable powder, free of gummy, sticky and lumpy characteristics. This product has excellent physical characteristics and is very useful in making food products of the type previously mentioned. Essentially it consists of various sugars and a minor proportion of starch with little, if any, protein.

It provides a very convenient form for adding to food ingredients which are usually added in the form of syrups that are difficult to handle.

In the foregoing process, the thin film principle of drying is very important. Thin film drying can be accomplished in a number of ways on commercial drying equipment, for example, by using a double drum hot roll drier either operated at atmospheric pressures or in a vacuum chamber, and tray driers or conveyor driers, again operated either at atmospheric pressures or in a vacuum chamber. The essential feature of the drying method is to subject a thin film of high fructose corn syrup slurry (with or without honey) to a heated surface. The temperature of this surface is usually controlled in a range of 325°F. to 375°F. Exposure of the film to the surface is brief, consisting of approximately 5 to 30 seconds.

A preferred method of dehydration is to use a double drum hot roll drier. Using this equipment, it is possible to adjust the surface temperature of the rollers by means of controlling the steam pressure in the double drums. It should be understood, however, that other methods of effecting a thin film drying are known and are applicable. The drying equipment, although important, is secondary to the thin film drying principle.

In a commercial process the drying process must meet the requirements of low cost to make the process feasible from a commercial standpoint. In terms of the drying process, this means that the raw slurry going to the driers must be easily handled and the dried material coming from the driers must also be in such condition that it can be handled with ease and can be converted into a granular or powdered mass quickly and easily. It should also remain in this condition over long periods of time.

In dehydrating a high fructose corn syrup, with or without honey, using a process of the type previously described on a double drum hot drier to effect thin film drying, the slurry is poured into the nip between the two rolls and the film which forms adheres to the rolls and is scraped from the roll surfaces by a stationary knife blade associated with each of the rolls after the roll containing the film has rotated a distance which is usually at least half the circumference of the roll. The film is then collected. It is at this point that the characteristics of the film are judged. The film as it forms on the rollers is usually sticky initially as it moves away from the point of contact of the two rollers. When good drying characteristics are present, the two films from the two roller surfaces will not have a tendency to adhere to each other. Certain sugar syrups such as high fructose corn syrup, however, tend to be adhesive and therefore the two films may adhere to each other when scraped from the rollers and collected. It is believed that this is due to the fact that the film does not assume a crystalline character rapidly enough. From the standpoint of physical properties, the film does not have enough crispness. Crispness and ease of obtaining a film or sheet, and the thickness of the sheet are characteristics which are of essential importance in thin film drying.

OBJECTS

One of the objects of the present invention is to provide an improved process for preparing solidified high fructose corn syrup, with or without honey, in which the thin film principle of drying is utilized with the addition of an additive to the slurry to be dehydrated whereby the crispness of the film is enhanced and the rate at which the film assumes a non-adhesive crystalline structure is increased.

Another object of the invention is to produce solidified compositions of the type described having a substantial protein content. Other objects will appear hereinafter.

BRIEF SUMMARY OF THE INVENTION

In accordance with the invention high fructose corn syrup is dehydrated by intimately mixing said syrup with an at least partially de-fatted soy protein, with or without an ungelatinized starch having a gelatinization temperature of at least 150°F., in sufficient amount to form a slurry, and subsequently subjecting said slurry in a thin film to a heated surface for a period of time sufficient to dehydrate said slurry, the protein content of said soy protein being at least 45 percent by weight, the water soluble protein content being at least 20 percent by weight, the weight ratio of water soluble protein to fat content being at least 1.5:1 and the quantity of said soy protein being sufficient to enhance the crispness of said film so that the dehydrated film assumes a crystalline character more rapidly than would be the case without the addition of such soy protein. The resultant dehydrated film is therefore essentially non-adhesive and can readily be ground to a dry-appearing, flowable powder free of gummy, sticky and lumpy characteristics. The problem of "double sheeting" is thereby avoided and the rate of production can be increased. At the same time a product is obtained containing a substantial amount of protein which is advantageous from the standpoint of food value. If desired, a portion of the high fructose corn syrup can be replaced by honey. De-aerating agents (emulsifiers) are preferably added and anti-humectants can be added to the product.

DETAILED DESCRIPTION OF THE INVENTION

The product obtained in accordance with the invention consists essentially of the following ingredients:

| Ingredients | Parts by Weight |
| --- | --- |
| High fructose corn syrup solid | 40–70 |
| Partially gelatinized starch of a type having a gelatinization temperature of at least 150°F. | 60–0 |
| Honey Solids | 0–60 |
| Soy protein of the type described | 0–30 |
| Water | 0.5–4.0 |
| Emulsifier | 0–1 |
| Anti-humectant | 0–1 | with the further proviso that the product contains at least 0.25 part of said soy protein when it also contains added starch, and at least 30 parts of said soy protein when it contains no added starch.

The invention is based upon the discovery that a high protein, high water soluble at least partially defatted soy protein when intimately mixed with a high fructose corn syrup, with or without honey, to form a slurry and subsequently subjecting said slurry in a thin film to a heated surface for a period of time sufficient to dehydrate said slurry will enhance the crispness of the film and facilitate the rapidity with which a crystalline structure is formed in the dehydrated film.

In order to be effective, the soy protein must have a high protein content of at least 45 percent by weight and the water soluble protein content should be at least 20 percent by weight of the total protein content, preferably within the range of 20 to 90 percent by weight. A soy protein should be used which has been at least partially defatted and the weight ratio of water soluble protein to fat content should be at least 1.5:1 and preferably within the range of 1.5:1 to 90:1. Percentagewise in terms of weight percent the fat content of the soy protein is usually within the range of 1 to 16 percent, but a soy protein having a high protein content and a low fat content in which the water soluble protein content is relatively low is ineffective for the purpose of the invention.

If honey is mixed with the high fructose corn syrup the weight ratio of honey solids to high fructose corn syrup solids is usually within the range of 15:85 to 85:15.

If no starch is added to the slurry the quantity of soy protein should be at least approximately 30 parts by weight for every 70 parts by weight of sugar syrup. This naturally results in a product having a substantial protein content.

It is preferable, however, to add both an ungelatinized starch of the type described and a soy protein of the type described to the high fructose corn syrup (with or without honey) in proportions within the range of 0.25 part to 29.75 parts by weight of said soy protein as soy protein flour, and 29.75 parts to 0.25 part by weight of said starch per 70 parts by weight of said high fructose corn syrup.

When a starch is used, the slurry is heated to a temperature 15° to 30° below the gelatinization temperature of the starch and held at said temperature until the starch is conditioned to the extent that it will only partially gelatinize when subsequently heated above the gelatinization temperature. Thus, when the slurry is in a thin film and is heated on a heated surface above said gelatinization temperature for a period of time sufficient to dehydrate the slurry, the starch is simultaneously partially gelatinized. At the same time the presence of a soy protein of the type described in the amounts previously indicated results in the production of a crisp dehydrated film of crystalline character which is essentially non-adhesive and readily ground to a dry-appearing flowable powder.

In order to obtain optimum results the slurry containing the high fructose corn syrup (with or without honey) and the other ingredients previously mentioned is deaerated during heating. Deaeration is facilitated by adding a small amount of an emulsifier, for example, 0.2 to 0.8 percent and usually not exceeding 1 percent of total solids. Emulsifiers contain both hydrophile and hydrophobe groups and are effective in causing the release of entrapped air. The deaeration which occurs can be observed by examination of the slurry under a microscope. A preferred deaerator is hydroxylated lecithin. Other suitable emulsifiers are glycerol mono- and di-stearate or any of the polyoxyethylated emulsifiers normally used in making bread and other bakery products.

The ungelatinized starch employed in the process is preferably wheat starch which has a gelatinization temperature around 160°F. Other examples of suitable starches are corn and rice starch. Wheat starch and rice starch are superior to corn starch because they are bland in flavor, whereas corn starch carries a definite flavor characteristic which it imparts to the finished dried product.

MOdified grain starches of the types indicated above may be usable provided that the temperature required for gelatinization is not lower than 150°F. Wheat flour, corn flour, and rice flour are all usable materials in place of the corresponding extracted starches. However, the flavor of the flour in each case is definitely stronger than that of the extracted starch. Therefore, although the flours can be used from a technical standpoint, they are not very feasible for use from a commercial standpoint relative to the taste of the finished dried product.

Root starches such as tapioca and potato are not very successful; in fact, they are almost impossible to use because of their lower gelatinization temperature thereby providing the possibility for too much gelatinization during the drying step.

The double drum hot roll drier is the preferred method of accomplishing the thin film drying step. Using this equipment, it is possible to adjust the surface temperature of the rollers by means of controlling the steam pressure entering the double drums. It should be understood, however, that other methods of effecting thin film drying are known and therefore will be applicable to the principle of this invention. The drying equipment, although important, is secondary to the thin film drying principle.

Where a double drum hot roll drier is used, the thickness of the sheet coming from the drying rolls is of some importance and is preferably around 0.011 inch and within the range of 0.006 to 0.015 inch. This can be determined by routine experimentation. If the sheet is too thin it will be too frangible and cause dusting and if it is too thick it may not assume a crystalline structure rapidly enough to meet production demands. In general, the sheet should be thick enough so that it is self-supporting and can be readily handled without being adhesive in character.

The invention will be further illustrated but is not limited by the following example.

EXAMPLE

The following ingredients were combined:

| Ingredients | Parts by Weight |
| --- | --- |
| High fructose corn syrup (H.F.C.S.) | 70.0 |
| Wheat starch | 0.5–29.5 |
| Soy protein | 29.5–0.5 |

The H.F.C.S. was warmed from approximately room temperature to approximately 110°F. The starch and soy protein were then added and the mixture stirred until a smooth slurry was obtained. This slurry was then further warmed and held at an elevated temperature of 130°F. At this point 0.5 part by weight of hydroxylated lecithin was added and mixing was continued to deaerate the slurry. The time required for the first step was approximately 7 to 10 minutes and an additional 5 minutes was required to deaerate the slurry.

When mixing and deaeration was complete the steam was shut off and the mixer stopped. It was then allowed to stand for a minimum of 8 hours and as long as 16 hours. During this standing the temperature will have dropped below 130°F.

The mixer is then started and heat is applied to return the temperature to 130°F. At this point the slurry is ready for pumping to a hot roll drier.

Upon being pumped to the drier the slurry is permitted to fall into the nip between the two counter-turning rollers. The steam pressure in the rollers is maintained preferably at about 85 pounds per square inch and the roller speed is usually 2.5 revolutions per minute. If the steam pressure is increased the roller speed is increased. If the steam pressure is lowered the roller speed is lowered. These are minor mechanical adjustments and are not essential features of the invention.

Adjustment of the aperture between the rollers should preferably be such as to produce a sheet of the desired thickness as previously described. The aperture may vary relative to the amount of additive versus the amount of syrup solids in the slurry.

When all of the above features have been carefully controlled, as in this example, the film, when it reaches the knife blade, will be very easily shaved away from the surface of the hot rolls. The appearance of the sheet at the knife blade is that of a piece of thin white paper. It is limber because the temperature is still quite high. As cooling takes place, however, the sheet becomes rapidly fragile and shatterable. This is a matter of seconds. The sheet is easily then passed through a hammermill or other milling device to reduce the particle size to that desired. The ideal particle size is 100 percent through 30 mesh. Except for the addition of the soy protein, the general procedure is similar to that described in copending application Ser. No. 65,737.

Using this general procedure on a ten inch double drum hot roll drier with equipment for cooling the dehydrated product and with different types of soy proteins and different proportions of soy protein and starch, and by rating the characteristics of the dehydrated films in categories of "Good," "Fair," and "Poor," it was established that only soy proteins having a high protein content and a high water soluble protein content of at least 40 percent by weight received a rating of "Good." Examples of such proteins are the following:

a. A soy protein (Soya Fluff 200-W) having a protein content of 53.0 percent, a water soluble protein content of 70.0 percent and a fat content of 1.0 percent;

b. A soy protein (Soya Fluff 200-C) having a protein content of 53.0 percent, a water soluble protein content of 40.0 percent and a fat content of 1.0 percent;

c. A soy protein (Soyalose 105) having a protein content of 52.0 percent, a water soluble protein content of 65.0 percent and a fat content of 6.0 percent;

d. A soy protein (Soyarich 115) having a protein content of 45.0 percent, a water soluble protein content of 65.0 percent and a fat content of 16.0 percent;

e. A soy protein (Pro-Fam 70 H/S) having a protein content of 70.0 percent, a water soluble protein content of 90.0 percent and a fat content of 1.0 percent; and f. A soy protein (Pro-Fam 90 H/S) having a protein content of 90.0 percent, a water soluble protein content of 88.0 percent and a fat content of 1.0 percent.

Several other commercial soy proteins having the desired characteristics were also evaluated and rated "Good" (Ardex 550, NV Protein and Promine D).

A commercial protein (Pro-Fam 90 L/A) having a 90 percent protein content of which only 20 percent was water soluble protein rated "Fair," thereby indicating that the percentage of water soluble protein should be at least 20 percent of the total protein content.

Two soy proteins, Soya Fluff 200-T and Soyabits 100-T, both having a protein content of 53.0 percent and a fat content of 1.0 percent but a relatively low percentage (15.0 percent) of water soluble protein content rated "Poor." Similarly another soy protein having a protein content of 70.0 percent, a water soluble protein content of 10.0 percent and a fat content of 1.0 percent rated "Poor."

Comparable tests with other protein containing substances namely, defatted sesame seed flour, cotton seed flour, gelatinized corn flour, lactalbumen, crystallite cellulose (Avicel), wheat gluten, corn flour, barley flour, dried egg albumen, animal gelatin, autolyzed yeast and dried buttermilk each rated "Poor."

In the foregoing tests 1.0 percent of the protein materials was used, i.e., one part of protein material replaced one part of wheat starch in the preparation of the slurry.

The results of these evaluations indicates that only soybean materials having high protein and high water solubility are effective for the intended purpose and materially add to the film-forming, crispness and crystalline nature of the film in the drying of high fructose corn syrup, with or without the addition of honey. A functionality of the soy protein fraction added to the slurry becomes of greater effect as the percentage of high fructose corn syrup is raised in relation to liquid honey, where the slurry contains both honey and high fructose corn syrup.

Tests using various levels of the soy protein fractions show that at the low end of the scale 0.25 part is the minimum which shows any effect whatsoever. At the high end of the scale it has been found that all of the starch can be replaced with a high protein high water soluble protein soy fraction. Thus, the slurry can be made with 70 parts of high fructose corn syrup and 30 parts of soy protein with no starch whatsoever. The manner in which the soy protein is prepared appears to be immaterial so long as the protein content is high and the protein content has a high percentage of water soluble protein. The fat content is preferably low and usually does not exceed 6 percent although in one case a soy protein having a fat content of 16 percent was found to be effective. Methods of removing fat (or oil) from soy proteins are well known in the art. The method most often used currently is a solvent extraction method but oils can also be removed by the expeller method in which case the residual fat content is normally higher than that of the solvent extracted soy proteins. Defatted soy protein materials can also be treated, for example, by extraction with alkaline aqueous solutions to remove soy proteins and thereby produce soy proteins having a high protein content and a high water soluble protein content. Other methods can be used to modify, hydrolyze, or otherwise degrade soy products in order to produce derivatives having a high soy protein content, as well as a high percentage of water soluble proteins.

Throughout the specification and claims the "water solubility" of the water soluble soy protein refers to water solubility as determined by a standard testing method given in Association of Official Agricultural Chemists (A.O.A.C.) 9th Edition, page 164, test 13.032, published in 1960.

The invention is hereby claimed as follows:

1. A process for dehydrating high fructose corn syrup which comprises intimately mixing said syrup with an at least partially defatted soy protein and an ungelatinized starch having a gelatinization temperature of at least 150°F. to form a slurry, heating said slurry to a temperature 15° to 30° below the gelatinization temperature of said starch and holding at said temperature until said starch is conditioned to the extent that it will only partially gelatinize when subsequently heated above the gelatinization temperature, and subsequently subjecting said slurry in a thin film to a heated surface above said gelatinization temperature for a period of time sufficient to dehydrate said slurry and simultaneously to partially gelatinize said starch, the protein content of said soy protein being at least 45 percent by weight, the water soluble protein content of said soy protein being at least 20 percent by weight of the total protein content, and the weight ratio of water soluble protein to fat content in said soy protein being at least 1.5:1, the quantity of said soy protein being sufficient to enhance the crispness of said film to obtain a thin crisp dehydrated film of crystalline character which is essentially non-adhesive and readily ground to a dry appearing flowable powder, the quantity of said soy protein, said starch and said high fructose corn syrup being within the range of 0.25 part to 29.75 parts by weight of soy protein as soy protein flour and 29.75 parts to 0.25 part by weight of said starch per 70 parts by weight of said high fructose corn syrup.

2. A process as claimed in claim 1 in which said soy protein is a soy flour having a water soluble protein content within the range of 20 percent by weight to 90 percent by weight.

3. A process as claimed in claim 1 in which the weight ratio of water soluble protein to fat content of said soy flour is within the range of 1.5:1 to 90:1.

4. A process as claimed in claim 1 in which said starch is wheat starch.

5. A process as claimed in claim 1 in which liquid honey is added to said slurry in an amount sufficient to give a weight ratio of high fructose corn syrup solids to honey solids within the range of 15:85 to 85:15.

6. A product resulting from the process of claim 1.

7. A product resulting from the process of claim 5.

* * * * *